(12) United States Patent
Galbraith et al.

(10) Patent No.: US 11,849,187 B2
(45) Date of Patent: *Dec. 19, 2023

(54) SYSTEM, DEVICE, AND PROCESSES FOR INTELLIGENT START PLAYBACK OF PROGRAM CONTENT

(71) Applicant: Sling TV L.L.C., Englewood, CO (US)

(72) Inventors: Edward Galbraith, Draper, UT (US); Robert Spencer, Highland, UT (US)

(73) Assignee: Sling TV L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/886,292

(22) Filed: Aug. 11, 2022

(65) Prior Publication Data

US 2022/0385980 A1 Dec. 1, 2022

Related U.S. Application Data

(63) Continuation of application No. 17/331,769, filed on May 27, 2021, now Pat. No. 11,451,872.

(51) Int. Cl.

| | |
|---|---|
| *H04N 21/472* | (2011.01) |
| *H04N 21/431* | (2011.01) |
| *H04N 21/4402* | (2011.01) |
| *H04N 21/61* | (2011.01) |
| *H04N 21/4335* | (2011.01) |
| *H04N 21/4147* | (2011.01) |

(52) U.S. Cl.
CPC ... *H04N 21/47217* (2013.01); *H04N 21/4147* (2013.01); *H04N 21/431* (2013.01); *H04N 21/4335* (2013.01); *H04N 21/4402* (2013.01); *H04N 21/6125* (2013.01)

(58) Field of Classification Search
CPC ......... H04N 21/47217; H04N 21/6125; H04N 21/431; H04N 21/4335; H04N 21/4402; H04N 21/4147
See application file for complete search history.

(56) References Cited

U.S. PATENT DOCUMENTS

| | | | |
|---|---|---|---|
| 2003/0031455 A1* | 2/2003 | Sagar ................. | H04N 21/4325 386/E5.043 |
| 2006/0064721 A1 | 3/2006 | Del Val et al. | |
| 2006/0248569 A1 | 11/2006 | Lienhart et al. | |
| 2007/0157240 A1 | 7/2007 | Walker | |
| 2008/0152316 A1 | 6/2008 | Sylvain | |
| 2009/0172723 A1* | 7/2009 | Shkedi ............... | H04N 21/4312 725/32 |

(Continued)

*Primary Examiner* — Fernando Alcon
(74) *Attorney, Agent, or Firm* — KW Law, LLP (57) ABSTRACT

Systems, devices, and processes are provided to facilitate the streaming of a playback of a recorded program in a video playback recording system. These systems, devices, and processes provide operating the cloud-based DVR in a recording mode for user selection of program content for recordation in a video playback file by the cloud-based DVR wherein the video playback file containing the program content is recorded by the user selection beginning with a start time associated with the DVR event file; and generating a manifest file that contains a program marker of a start time of the program content omitting any recorded commercial content at a beginning of the video playback file associated by beginning of the recording from the start time associated with the DVR event file.

20 Claims, 3 Drawing Sheets

(56) References Cited

U.S. PATENT DOCUMENTS

| | | | |
|---|---|---|---|
| 2013/0247091 A1* | 9/2013 | Wong | G11B 27/005 |
| | | | 725/32 |
| 2014/0149210 A1 | 5/2014 | Ma et al. | |
| 2014/0229976 A1 | 8/2014 | Ma et al. | |
| 2014/0237525 A1* | 8/2014 | Rothschild | H04N 21/47202 |
| | | | 725/92 |
| 2014/0376884 A1* | 12/2014 | Lovell | H04N 21/4334 |
| | | | 386/292 |
| 2015/0052571 A1 | 2/2015 | Stokking et al. | |
| 2015/0271541 A1 | 9/2015 | Gonder et al. | |
| 2018/0098103 A1 | 4/2018 | Lintz et al. | |
| 2018/0270534 A1 | 9/2018 | Badawiyeh | |
| 2018/0288468 A1 | 10/2018 | Yamagishi et al. | |
| 2019/0037273 A1* | 1/2019 | Ross | H04N 21/812 |
| 2019/0174175 A1* | 6/2019 | Elbert | H04N 21/4334 |
| 2020/0382840 A1 | 12/2020 | Muvavarirwa | |
| 2020/0413141 A1 | 12/2020 | Loheide et al. | |
| 2022/0394330 A1* | 12/2022 | Sai | H04N 21/8456 |

\* cited by examiner

SYSTEM, DEVICE, AND PROCESSES FOR INTELLIGENT START PLAYBACK OF PROGRAM CONTENT

CROSS-REFERENCE TO RELATED APPLICATIONS

This application claims priority to U.S. patent application Ser. No. 17/331,769, which was filed on May 27, 2021, and is entitled "SYSTEM, DEVICE, AND PROCESSES FOR INTELLIGENT START PLAYBACK OF PROGRAM CONTENT," which is incorporated by reference herein.

TECHNICAL FIELD

The following discussion generally relates to the playback of recorded program content. More particularly, the following discussion relates to intelligent start playback of the recorded program content at the start of the program content and not a beginning of a DVR event file.

BACKGROUND

It is often the case that viewers receive their television programming through a cable, direct broadcast satellite (DBS), IPTV, or similar subscription-based service. The television service may be broadcast from a cable, DBS, or other content aggregators to multiple subscribers. The subscribers may then view received content as live broadcasts, and/or may store the content on digital video recorders (DVRs), Set-Top Boxes (STB), at cloud servers, or the like for later viewing. It is also now commonplace for end-users to place shift media content stored in memory contained in or accessible to a home media receiver, such as an STB located at the end user's residence, over a network for viewing on a smartphone, tablet, or other portable media receiver operated by the end-user. Hence, the viewer may choose to place shift received content from their homes or other access points to mobile devices for remote viewing or download the content at the mobile device for viewing later, or as desired.

The content, including video-on-demand (VOD) and television (TV) programming, can be delivered to viewers over cable and satellite broadcast systems. Also, various streaming video platforms have been introduced by media content providers and gained widespread commercial adoption; the term "media content provider," encompasses all types of media content sources, aggregators, and the like from which content-containing digital or analog signals can be obtained for viewing on user devices. This can include cable, satellite, and over-the-top (OTT) TV providers, as well as entities owning or operating streaming video platforms.

The program content recorded by a DVR is typically not aligned with the start or beginning of the recorded content that has been produced for viewing (i.e., TV show). It is often the case before the recorded content is displayed, commercials and other media are displayed in the recorded DVR file. For example, there may be commercials that are presented at the beginning of the recorded DVR file or portions of the preceding show. The latter is often the case when the DVR event operates to start recording before a selected time slot (e.g., 3 to 4 minutes before the hour) that the program is broadcast. This recorded non-solicited and/or extraneous content by the viewer degrades the recorded playback viewing experience of the user viewing by the viewing having to view the not wanted content that is contained in the playback recorded content. To avoid viewing the content, the user often has to manually select a fast-forward playback option on a remote control or the viewing device and skip through the undesired content until the program or desired content is presented in the playback mode of the recorded content. Also, the undesired content takes up memory space which can be significant when aggregated amongst many recorded TV shows. Further, the efficiency and overall performance of the DVR playback are lessened by having to store the extraneous recorded content.

Therefore, it is desirable to enable a smart start type playback recording feature enabled by the DVR device that can intelligently start the playback of the recorded program at a point in time of the actual commencing in the recorded playback display of the program content, rather than at the beginning of the DVR event file which may not align with the actual start time with the display of the playback of the recorded content.

Hence, there remains a desire to provide systems and methods that improve the delivery of program content to the viewers using the DVR recorded playback mode of operations.

Other desirable features and characteristics will become apparent from the subsequent detailed description and the appended claims, taken in conjunction with the accompanying drawings and this background section.

BRIEF SUMMARY

Various embodiments provide systems, devices, and processes to improve the delivery of program content in a video playback recording system.

In one example embodiment, an automated process executable by a cloud-based digital video recorder (DVR) in communication with at least one video player device over a network is provided. The automated process includes operating the cloud-based DVR in a recording mode to enable user selection of program content in a program channel displayed in a graphic user interface (GUI) at a local device for recordation in a video playback file by the cloud-based DVR wherein the video playback file containing program content is recorded by the user selection beginning with a start time associated with a DVR event file; in response to the user selection of the program content in the program channel, recording the video playback file containing the program content by the cloud-based DVR beginning with the start time associated with the DVR event file wherein the start time from the DVR event file includes prior commercial content in the program channel; generating, by the cloud-based DVR, a manifest file that contains a program marker of the start time of the program content omitting any recorded commercial content at a beginning of the video playback file associated by beginning of the recording from the start time associated with the DVR event file; operating the cloud-based DVR in a playback mode and selecting at least one recorded program content for playback; and in response to selection of at least one recorded program content for playback, presenting the playback of the program content beginning at the start time set by the program marker contained in the manifest file.

In one exemplary embodiment, the automated process includes generating, by the cloud-based DVR, the manifest file that contains the program marker of the start time of the program content omitting any recorded extraneous content at a beginning of the video playback file associated with the DVR event file.

In one exemplary embodiment, the automated process includes generating, by the cloud-based DVR, the manifest file that contains a set of program markers of both a start and an end time of any recorded extraneous content in the video playback file associated with the DVR event file to omit by the set of program marker the any recorded extraneous content in the video playback file when received by the video player device.

In one exemplary embodiment, the automated process includes wherein the cloud-based DVR generates the manifest file for starting at a beginning of the program marker rather than the beginning of the DVR event file.

In one exemplary embodiment, the automated process includes using the program marker to delete extraneous content at least at the beginning of the video playback file to save storage space when storing the video playback file at a cloud server or the local device.

In one exemplary embodiment, the automated process includes providing a recorded playback of the program content without at least commercial content based on at least one program marker to the video player device for presenting the program content without the at least commercial content to the video player device.

In one exemplary embodiment, the automated process includes monitoring the program channel to identify the commercial content in the program channel; and removing the commercial content from the recorded playback based the at least one program marker to the video player device.

In one exemplary embodiment, the automated process includes continuing to monitor the program channel to detect an ending of the commercial content while recording the selected program content.

In one exemplary embodiment, the automated process includes wherein monitoring the program channel to identify the commercial content in the program channel includes comparing content in the program channel to previously identified commercial content.

In another exemplary embodiment, an automated process executable by a cloud-based digital video recorder (DVR), the cloud-based DVR in communication with a video player device over a network is provided. The automated process includes operating the cloud-based DVR in a recording mode to enable user selection of program content in a program channel displayed in a graphic user interface (GUI) at a local device for recordation in a video playback file by the cloud-based DVR wherein the video playback file containing program content is recorded by the user selection beginning with a start time associated with a DVR event file; in response to the user selection of the program content in the program channel, recording the video playback file containing the program content by the cloud-based DVR beginning with the start time associated with the DVR event file wherein the start time from the DVR event file includes prior commercial content in the program channel; generating, by the cloud-based DVR, a manifest file that contains a program marker of the start time of the program content omitting any recorded commercial content at a beginning of the video playback file associated by beginning of the recording from the start time associated with the DVR event file; operating the cloud-based DVR in a playback mode and selecting at least one recorded program content for playback; and in response to selection of at least one program content for playback, presenting the playback of the program content beginning at the start time set by the program marker contained in the manifest file.

In one exemplary embodiment, the automated process includes generating, by the cloud-based DVR, the manifest file that contains the program marker of the start time of the program content omitting any recorded extraneous content at a beginning of the video playback file associated with the DVR event file.

In one exemplary embodiment, the automated process includes generating, by the cloud-based DVR, the manifest file that contains a set of program markers of both a start and an end time of any recorded extraneous content in the video playback file associated with the DVR event file to omit by the set of program marker the any recorded extraneous content in the video playback file when received by the video player device.

In one exemplary embodiment, the automated process includes wherein the cloud-based DVR generates the manifest file for starting at a beginning of the program marker rather than the beginning of the DVR event file.

In one exemplary embodiment, the automated process includes using the program marker to delete extraneous content at least at the beginning of the video playback file to save storage space when storing the video playback file at a cloud server or the local device.

In one exemplary embodiment, the automated process includes providing a recorded playback of the program content without at least commercial content based on at least one program marker to the video player device for presenting the program content without the at least commercial content to the video player device.

In one exemplary embodiment, the automated process includes monitoring the program channel to identify commercial content in the program channel; and removing the commercial content from the recorded playback based on at least one program marker to the video player device.

In one exemplary embodiment, the automated process includes wherein monitoring the program channel to identify commercial content in the program channel comprises comparing content in the program channel to previously identified commercial content.

In yet another exemplary embodiment, a cloud-based digital video recorder apparatus in communication with a video player device over a network, including a processor and a memory, wherein the processor is configured to perform an automated process by executing digital instructions stored in the memory is provided. The automated process includes operating the cloud-based DVR in a recording mode to enable user selection of program content in a program channel displayed in a graphic user interface (GUI) at a local device for recordation in a video playback file by the cloud-based DVR wherein the video playback file containing program content is recorded by the user selection beginning with a start time associated with a DVR event file; in response to the user selection of the program content in the program channel, recording the video playback file containing the program content by the cloud-based DVR beginning with the start time associated with the DVR event file wherein the start time from the DVR event file includes prior commercial content in the program channel; generating, by the cloud-based DVR, a manifest file that contains a program marker of a start time of the program content omitting any recorded commercial content at a beginning of the video playback file associated by beginning of the recording from the start time associated with the DVR event file; operating the cloud-based DVR in a playback mode and selecting at least one recorded program content for playback; and in response to selection of at least one program content for playback, presenting the playback of the program content beginning at the start time set by the program marker contained in the manifest file.

In one exemplary embodiment, the automated process includes generating, by the cloud-based DVR, the manifest file that contains the program marker of a start time of the program content omitting any recorded extraneous content at a beginning of the video playback file associated with the DVR event file.

In one exemplary embodiment, the automated process includes generating, by the cloud-based DVR, the manifest file that contains a set of program markers of both a start and an end time of any recorded extraneous content in the video playback file associated with the DVR event file to omit by the set of program marker the any recorded extraneous content in the video playback file when received by the video player device wherein the cloud-based DVR generates a manifest file starting at a beginning of the program marker rather than the beginning of the DVR event file. Various additional examples, aspects, and other features are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. Furthermore, there is no intention to be bound by any theory presented in the preceding background or the following detailed description.

Digital video recorders (DVRs) and personal video recorders (PVRs) allow viewers to record video in a digital format to a disk drive or other type of storage medium for later playback. DVRs are often incorporated into set-top boxes (STBs) for satellite and cable television services. A television program stored on a set-top box allows a viewer to perform time shifting functions and may additionally allow a viewer to skip over commercial breaks and other portions of the recording that the viewer does not desire to watch. However, the user performs this function manually, for example, using a fast forward button of a remote control associated with the DVR. This manual fast-forwarding is an inconvenience for the user.

Various embodiments provide systems, devices, and processes to improve the delivery of commercial content in a video streaming system. In general, the systems, devices, and processes facilitate the improved delivery of recorded content by identifying an actual start time to display in a playback of a recorded program thereby not playing extraneous and undesired content that had been recorded and would ordinarily be displayed to the playback to the viewer by the video player device.

Furthermore, because the embodiments switch to and from the user-tailored commercial channel automatically, the embodiments can provide these targeted advisements without requiring the user to manually change channels. Finally, because these embodiments switch to and from the user-tailored commercial channel in response detecting to the beginning and end of commercial content on the program channel, such targeted advertisements can be provided without the user missing significant content on the program channel.

The general concepts described herein may be implemented in any video streaming context but are especially relevant to the streaming of recorded television programming that commonly includes commercials amid live or pre-recorded programming. Of course, equivalent embodiments could be implemented within other contexts, settings, or applications as desired.

In various exemplary embodiments, the cloud-based DVR is configured to implement a combination of programming markers from DYNA (if available), CAIPY recognition technology, and a rules engine to determine when the show or program content starts.

In the various exemplary embodiment, upon playback, the cloud-based DVR would generate a manifest file starting at the beginning show marker rather than the beginning of the DVR event file.

Figure 1:
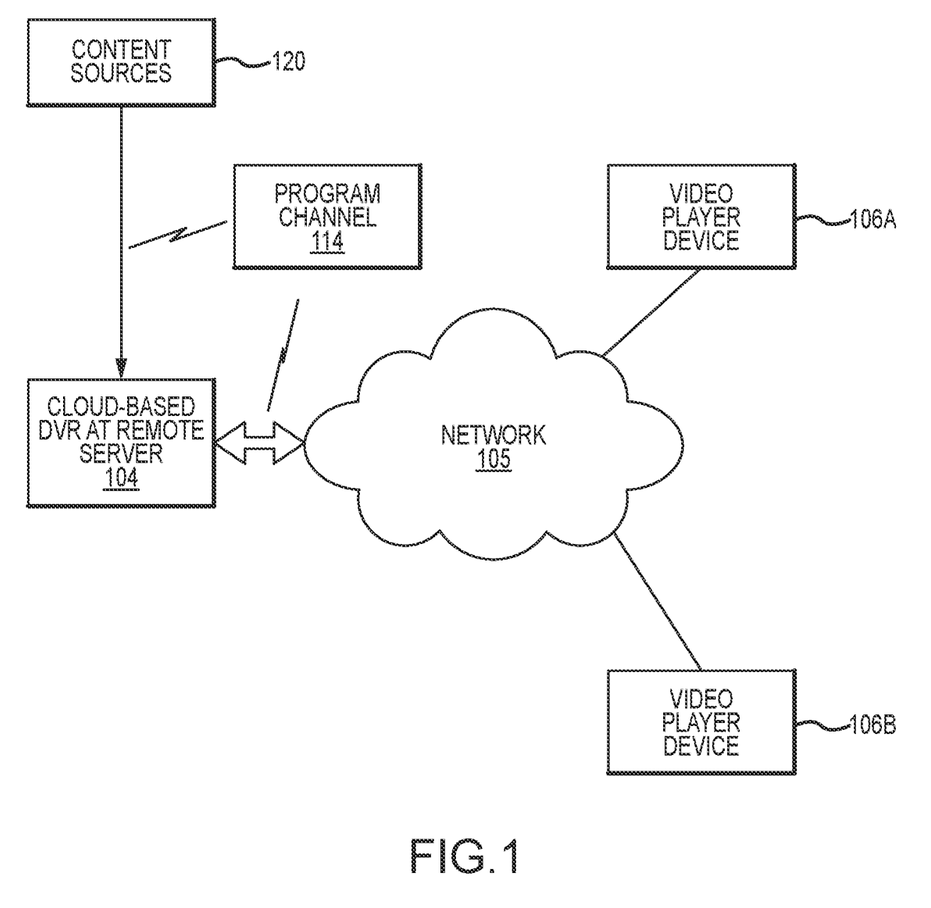
FIG. 1 is a diagram of an example video streaming system that includes a plurality of video player devices.

Turning now to the drawings and with initial reference to FIG. 1, a video playback recording system 100 suitably includes a digital video recorder (DVR) remotely configured at a cloud server (i.e. cloud-based DVR 104) that is in communication with a plurality of video player devices 106A-b. In general, the cloud-based DVR 104 records digital content or media that is selected for recording by a viewer. The cloud-based DVR 104 receives video content from one or more content sources 120, and transmits recorded video content through the network 105 to the video (Media) player devices 106A-B in the form of a video stream that can be received, processed, and displayed at the video player devices 106A-B.

In general, the content sources 120 can be any type of video content source, including media providers, content aggregators, or distributors such as a cable television system operator, a direct broadcast satellite (DBS) system operator, or simply a network service provider or the like. These content sources 120 can provide the video content to the cloud-based DVR 104 in any suitable form and by any suitable technique. For example, the video content can be provided via satellite, fiber optic, or any other conventional wireless or physical media for transmitting signals. The transmitted signals can be received, demodulated, and decoded as needed by any appropriate receiver(s) to extract program signals. The extracted programming signals can then be analyzed as appropriate to identify the program contents.

A distributor/aggregator, for example, may encode the extracted signals for distribution on a digital network, for aggregation and redistribution of signals over a DBS or cable distribution system, for generating content stored on a remote storage digital video recorder (RSDVR) or video on demand (VOD) service, or for any other purpose.

This content can then be passed to the cloud-based DVR 104 for communicating to the end-user or for recording. Having received this content, the cloud-based DVR 104 can encode the received content into a suitable format streaming a recorded playback video to the video player devices 106A-B (i.e. media player devices). For example, the cloud-based DVR 104 can transmit an encoded video stream via a content delivery network (CDN) for distribution on network 105 (e.g., the Internet) as part of an RSDVR, VOD, or other video streaming service. The video streams (or playback recorded video streams) are thus transmitted to the video player devices 106A-b.

In some embodiments, the content sources 120 and/or cloud-based DVR 104 can include time markers that can identify some specific start and stop times of content in the video content for use in configuring the recorded playback video file. For example, in some embodiments, the cloud-based DVR 104 is implemented to identify commercial content and/or live content and encode corresponding identifying information into the video streams transmitted to the video player devices 106A-B. Detailed examples of such content time marker configuration associated with start/stop times of commercial content used to enable the recorded playback of program content streamed from the actual start time of the program content recorded by the cloud-based DVR 104 will be described in greater detail below with reference to FIG. 3.

In general, each of the video player devices 106A-B includes a combination of hardware and/or software needed to receive, process, and play the video streams received from the cloud-based DVR 104. For example, each of the video player devices 106A-B can be implemented to include a streaming application stored in memory and is executed by a suitable processor. As some specific examples, each of the video player devices 106A-B can be implemented with any suitable computing device, including laptops, tablets, virtual reality (VR) devices, and mobile communication devices (e.g., smartphones). Such devices may include an integrated display screen or may be coupled to a separate display screen.

In one example embodiment, the video playback recording system 100 is implemented to perform one or more automated processes to start the playback at the actual start time (i.e., to omit, delete, or skip commercial content or other extraneous content) recorded in a playback video file by the cloud-based DVR 104 during the streamed playback of the recorded video content from the cloud-based DVR 104 to the plurality of video player devices 106A-B. In general, these automated processes provide for the improved delivery of recorded program content by the video playback recording system 100 by providing removal, omitting, or skipping in the recorded playback of certain digital content recorded at the beginning of the DVR event file (e.g., commercial or extraneous content recorded prior to the start of the actual program desired by the viewer for viewing) by creating a manifest file that removes the extraneous content and enables streaming of the recorded playback content immediately.

In an exemplary embodiment, the video playback recording system 100 provides for the monitoring of a program channel (or program content recorded based on the DVR event file) 114 received by the cloud-based DVR 104 for identifying in the streamed playback of the recorded program content based on the DVR event file by comparing certain commercial content identified in the program channel 114 or prior extraneous content and that may have been recorded and stored in memory. Once the cloud-based DVR 104 is placed in the playback mode, the removal or deletion of the prior or extraneous content is performed by recognition software from the recorded video playback file. This enables the streamed playback of the recorded content to occur without the extraneous or commercial content which is the actual start time of the recorded content and a time marker can be placed in a manifest file created that indicates this actual start time in the playback recording of the video recording file by the cloud-based DVR 104.

In an alternate exemplary embodiment, the cloud-based DVR 104 tailors the streamed recorded video file by detecting both the starting and end of the commercial content in the program channel 114 and removing the commercial content or enabling skipping of the commercial content by generating a set of time markers in the manifest file. For example, in response to detecting such a beginning and ending of commercial content in the program channel 114, the cloud-based DVR 104 can remove or automatically skip the commercial content when detected in the recorded video file and insert multiple time markers indicating when to perform the deletion or skipping of the commercial content detected as desired.

In such an embodiment, the monitoring of the program channel 114 to identify commercial content can be performed in several different ways. For example, the monitoring can be performed by comparing content in the program channel to previously identified commercial content. Furthermore, by using data from previous identification of the commercial content the precise ending time of such commercial content can be known in advance.

In another such embodiment, the monitoring of the program channel 114 to identify commercial content can be performed by monitoring for identification tags in the program channel provided by the program provider. In such an embodiment the program provider facilitates the identification of the commercial content by inserting the identification tags into the video stream at the beginning of commercial content. Likewise, similar ending tags can be inserted into the video stream at the ending of commercial content. In both cases, the tags can be detected by the streaming server to enable the automatic switching back to the program channel 114 at the time needed to avoid missing any program content in the program channel 114.

In one embodiment, the streaming of the program channel 114 comprises streaming linear programming, where "linear programming" is defined as content that is received from the content sources 120 and then immediately streamed to the video player devices 106A-B with only relatively small delays for processing. As such, linear programming can include a broadcast television channel or cable television channel that is received and streamed by the cloud-based DVR 104. As such, linear programming can include live programmings such as sports or other live events that are recorded and streamed from the cloud-based DVR 104 with only minimal delays between the recording of the event and the streaming of the event as linear programming.

In other embodiments, the streaming of the program channel 114 includes recorded playback video and the streaming of the recorded playback video from the cloud-based DVR 104. In another example, the streaming of the program channel 114 can include streaming from the cloud-based DVR 104 and has previously recorded the content of the program channel 114 for later streaming to the video player devices 106A-B.

Figure 2:
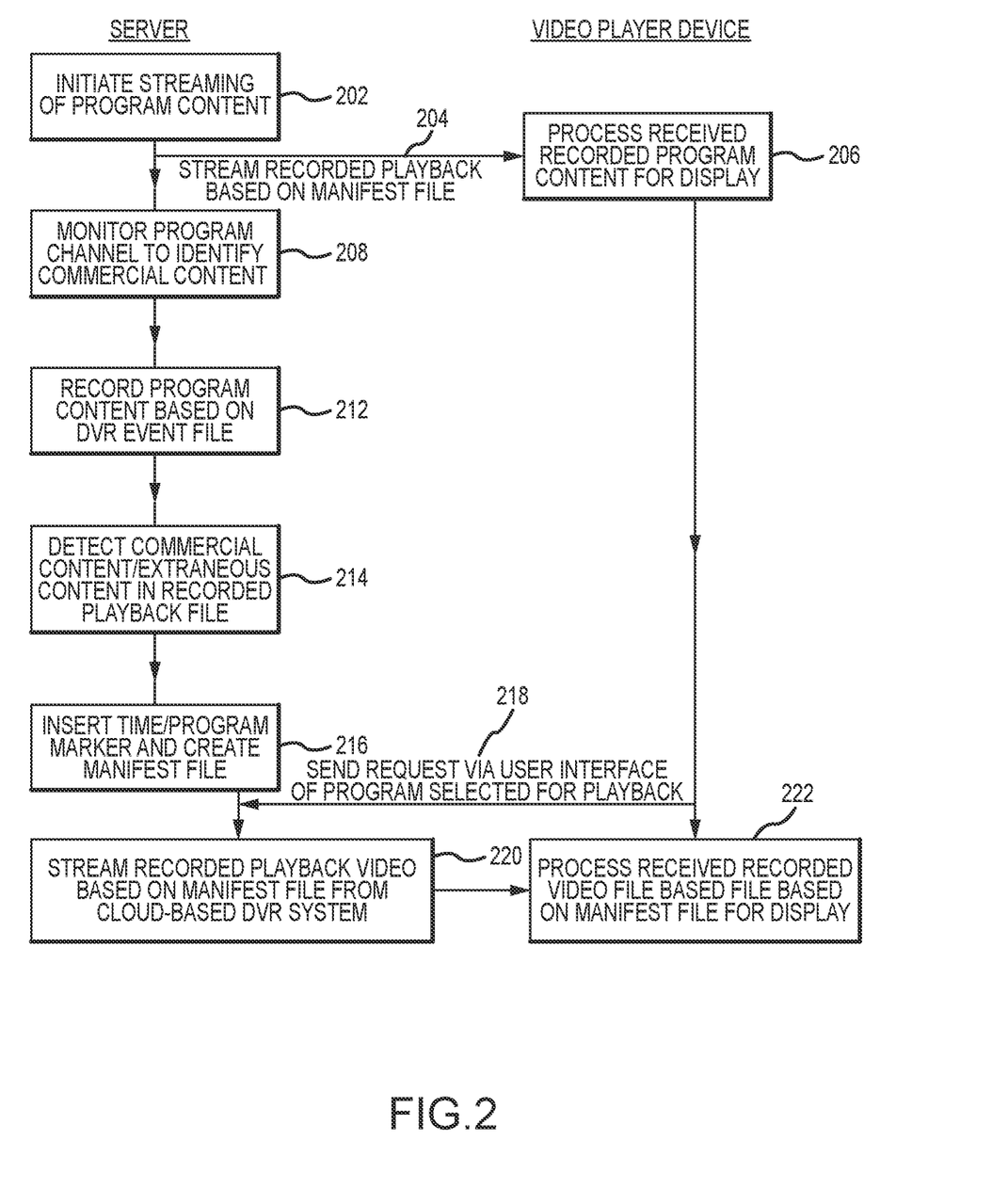
FIG. 2 is a flowchart showing various processes executable by various devices in a streaming media system.

Turning now to FIG. 2, a process flow diagram 200 illustrates various example processes and data flows that can be automatically executed by cloud-based DVR (e.g., cloud-based DVR 104) in a video playback recording system (e.g., video playback recording system 100) that includes one or more video player devices (e.g., video player devices 106A-B). Specifically, the process flow diagram 200 illustrates a process flow between exemplary streaming of recorded program content based on a manifest file rather than the DVR event file and an exemplary cloud-based DVR that provides for the automatic removal of at least prior commercial or extraneous content in the streamed playback of video recorded file using recognition software to identify at the commercial content based on monitoring a program channel (e.g., program channel 114) and insertion of time markers for identifying the start of the program content in the recorded video file.

To facilitate the process flow, communications between the various devices can be initiated and established in any suitable manner. For example, communication between the various devices and networks may be established using the Internet or other protocols that can include both wireless networking systems (e.g., Wi-Fi) or wired networking systems (e.g., Ethernet or HDMI).

At process step 202 the user initiates a streaming playback of record program content in a video session and/or the selection at the video player device using a user interface program content for recording and later viewing. At 204, the cloud-based DVR may begin transmitting a video stream of program content to the video player device using video selection and play function 204.

In a typical embodiment, the cloud-based DVR located at a remote server initiates the streaming video session at the direction of the video player device. For example, a streaming application on the video player device can communicate with the streaming server and provide the user interface for initiating a streaming video session of the program content. Process step 202 and video selection and play function 204 can include the encoding and transmitting of the selected recorded program channel from any suitable content source based on a manifest file rather than on the DVR event file. Additionally, such processing and transmitting can include transmitting using any suitable technique or protocol. As one detailed example, the streaming server can transmit an encoded video stream via a content delivery network for distribution of the Internet as part of an RSDVR, VOD, or other video streaming service. In these and other such embodiments these video streams are thus received at the video player devices as input video streams.

At process step 206, the video player device processes the received input video streams of the program content for display on the video player device. In this process step a streaming application and/or operating system and/or specialized hardware on the video player device performs typical video processing tasks associated with the receiving and displaying of video. For example, these elements can perform various decoding and rendering functions as needed to display the program channel on a video display device.

At process step 208, the cloud-based DVR monitors the program channel to identify commercial content. Thus, while the program channel is being streamed to the video player device the streaming server can identify when commercial content is being streamed in the program channel. This can include monitoring for both the starting and ending of commercial content.

This process step 208 (i.e., the recognition software) can be implemented and performed in several different ways. As one example, the monitoring of the program channel can be performed by comparing content in the program channel to previously identified commercial content. In such an example the audio and/or video content in the program channel can be analyzed to compare the content to previously identified commercial content. To facilitate such a comparison of program content to previously identified commercial content a database of previously identified commercial content can be provided. This database may reside on the remote server (e.g., cloud-based DVR 104) or separate computing devices.

As one specific example, the program content can be analyzed to recognize scene changes in the program content. When a scene change is identified a digital analysis of the audio and/or video in the new scene is performed to compare the new scene to previously recognized scenes that are stored in the database. If the new scene is found in the database, then a new occurrence of the recognized scene can be recorded in the database. If the scene is not recognized, then a new entry in the database may be created to identify subsequent occurrences of the new scene. To that end, a digital "signature" or "fingerprint" of the new scene can be stored for subsequent analysis.

In process step 208 such a comparison of program content to commercial content can be performed in real-time as content is received and processed by the streaming server. This allows the comparison to be performed and commercial content identified before the content is streamed to the video player device. Such a real-time identification of commercial content can enable the switching to the user-tailored commercial channel before such identified commercial content begins streaming to a video player device.

In another such embodiment of process step 208, the monitoring of the program channel to identify commercial content can be performed by monitoring for identification tags in the program channel. These identification tags can be inserted in the program content to identify the type of content being streamed in the program channel. Such identification tags can thus be used to identify the various types of content that may be included in the program content, including commercial content. In one example embodiment, these tags are provided by the content provider and thus are included in the content when it is received by the cloud-based DVR. In such an embodiment the identification tags can be used to identify both the beginning of commercial content and the ending of commercial content. In both cases, the tags can be detected by the streaming server to enable the automatic switching back to the program channel at the time needed to avoid missing any program content in the program channel.

While monitoring the program channel during process step 208, a request or set up is received from the video player device at process step 210. The process step 210 can be performed in one exemplary embodiment by a user configuring a selection menu to identify program content for recording in advance by the cloud-based DVR 104. In another embodiment, the user can select in an online electronic program guide, program content for recording and playing back subsequently by the cloud-based DVR 104.

Then in response to the user request for program content, at process step 212, the cloud-based DVR records at an appropriate time based on the DVR event file the program content request for playback at a later time or for downloading to the memory of a user device in local memory for playing of the recorded program content by the video player devices 106A-B.

At process step 214, the cloud-based DVR enables recognition software to detect commercial content if any, or other extraneous content that has been recorded in the record video playback file. For example, because the video recording is initiated based on the DVR event file, there is likely commercial content at the beginning of the recorded video playback file that requires removal or skipping.

At process step 216, upon detection of the commercial content or extraneous content in the recorded video playback file by the cloud-based DVR, the cloud-based DVR creates a manifest file with one or more time markers. The time markers are used to identify the commercial or other extraneous content, and enable the cloud-based DVR to delete, remove, skip the content, and begin the streamed recorded playback of the program content at the start of the program content immediately. In other words, prior commercial content that is usually played at the beginning of the show (i.e. the program content) is removed or skipped so that viewer only sees a display of the playback recorded video file beginning at the start or start time of the program or show desired.

This enables the cloud-based DVR to automatically skip, delete, not show, etc. the prior commercial content when streaming the program content selected by the viewer to the video player device. The viewer no longer has to manipulate the playing control functions to skip the commercial content. Also, because the commercial content is no longer (if deleted) saved in the recorded playback video file, memory saving is realized and the amount of space used to record and save selected video content is better optimized (i.e., a spacing saving is realized when storing a selected program content).

At process step 216, the cloud-based DVR creates a manifest file, insert at least one time indicative of the start of the program content. Also, multiple time markers can be inserted in the recorded video file for skipping, deleting extraneous and commercial content.

At process step 218, the cloud-based DVR can receive a request for playback of the recorded program content. For example, the user may enable an app located at the video player device to instruct the video player device to playback a selected recorded program content.

At process step 220, the cloud-based DVR streams the recorded playback video file of the program content based on the manifest file. At process step 222, the video player device processes the received input video streams of the user-selected recorded playback video file for display on the video player device. Again, in such a process step a streaming application and/or operating system and/or specialized hardware on the video player device performs typical video processing tasks associated with the receiving and displaying of video. For example, these elements can perform various decoding and rendering functions as needed to display the user-tailored program channel on a video display device.

Figure 3:
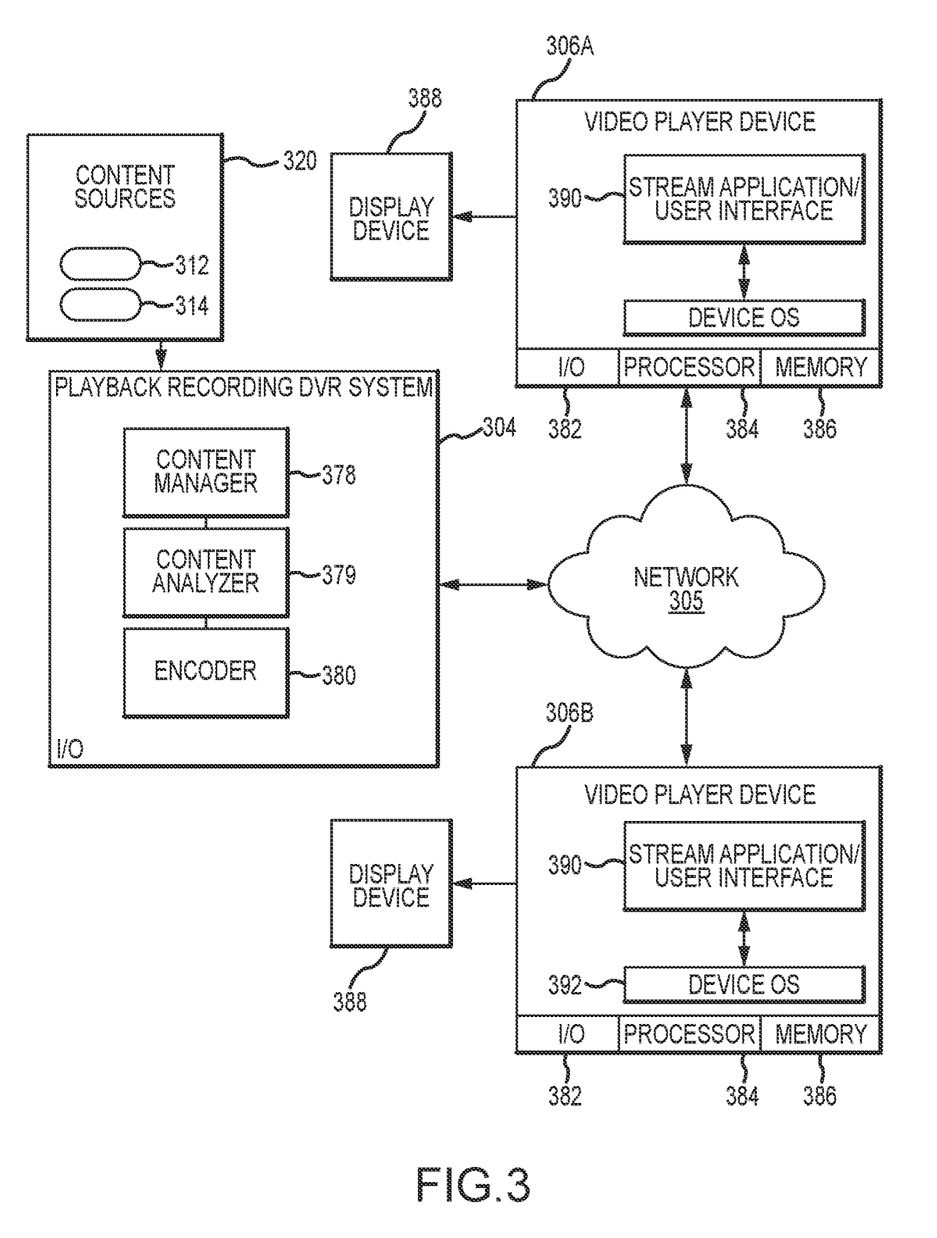
FIG. 3 is a detailed diagram of one example implementation of a streaming media system.

Turning now to FIG. 3 a video playback recording system 300 suitably includes a cloud-based DVR system 304 for streaming recorded video program content and a plurality of video player devices 306A-B. In general, the cloud-based DVR system 304 receives video content from one or more content sources 320 and transmits recorded selected program content of that video content received through the network 305 to the video player devices 306A-B in the form of a video stream that can be received, processed, and displayed at the video player devices 306A-B. The video playback recording system 300 is an example of the type of system that can be used to implement to create the manifest file, remove or skip commercial content and stream the program content selected to the viewer for display from the beginning of the program content, not from the DVR event file. For example, the video playback recording system 300 can be used to implement the process flow illustrated in the process flow diagram 200 of FIG. 2.

In general, the content sources 320 can be any type of video content source, including media providers, content aggregators, or distributors such as a cable television system operator, a direct broadcast satellite (DBS) system operator, or simply a network service provider or the like. In accordance with the embodiments described herein, the content sources include commercial channel 312 and at least one program channel 314. The cloud-based DVR system 304 processes the received content into a suitable format streaming to the video player devices 306A-B. To facilitate this, the cloud-based DVR system 304 includes at least an I/O 372, a processor 374, and a memory 376. Additionally, the cloud-based DVR system 304 includes a content manager 378, a content analyzer 379, and an encoder 380.

In general, each of the video player devices 306A-B includes a combination of hardware and/or software needed to receive, process, and play the video streams received from the cloud-based DVR system 304. For example, each of the video player devices includes an I/O 382, a processor 384, a memory 386, and a display device 388. Furthermore, each of the video player devices 306A-B includes a streaming application 390 with a user interface for program selection, and a device OS 392 residing in memory 386 and being executed by the processor 384. As some specific examples, each of the video player devices 306A-B can be implemented with any suitable computing device, including laptops, tablets, and mobile communication devices (e.g., smartphones). Such devices may include an integrated display device 388 or may be coupled to a separate display device 388.

The content sources 320 can include content from a content aggregator or distributor such as a cable television system operator, a direct broadcast satellite (DBS) system operator, a streaming media provider, or simply a network service provider or the like. Other embodiments could provide the features described herein using conventional computing machinery (e.g., physical or cloud-based servers) by parties that may or may not be interested in re-distributing the received content, as desired.

In various embodiments, television signals for one or more networks, channels, or the like are received in any format by the system operator via satellite, fiber optic, or any other conventional wireless or physical media for transmitting television signals. The signals are received, demodulated, and decoded as needed by any appropriate receiver(s) to extract program signals that represent the decoded television program stream. Alternately or additionally, content sources 320 may receive content directly from a broadcaster, distributor, or another source, as desired.

In a typical embodiment, the received programming signals are analyzed as appropriate to identify the program contents. For example, the content analyzer 379 can be implemented to analyze audio and/or video content in the programming signals. Such a system can be used to recognize advertisements (e.g., commercials) or other portions of the underlying content. As described above, such a system can be used to facilitate automatic switching to a program channel in response to the detection of the start of commercial content. Likewise, such a system can be used to facilitate automatic switching back to the program channel in response to detection of the ending of commercial content.

In a typical embodiment, the content analyzer 379 executes a software application that performs the analysis based upon the audio and/or video content received. In various embodiments, content analyzer 379 may consider average zero-crossing rate, average spectrum, spectral flatness, prominent tones across a set of frequency bands, bandwidth, and/or any other characteristics of the audio or video signal. Other embodiments could equivalently perform a temporal analysis in addition to or in place of frequency analysis. Such a temporal analysis could, for example, identify peak (or peak RMS) values in the time domain signal to find beats (e.g., in music) or other times between peak values that can uniquely identify the content. This temporal analysis could be combined into a fingerprint or signature in any way or could be considered separately from other factors. Many different audios and video fingerprinting or other automated analysis programs could be used in any number of other embodiments.

The extracted content data may be compared to data previously stored in a database, as appropriate, to identify portions of content in the program stream. Commercials, for example, can be recognized when the audio portions of the program stream contain similar data to known audio data stored in a database. Such a database may make use of conventional database software, or the database may be a custom database developed to store content recognition data, as desired. Such a database may reside on the same computing hardware as the cloud-based DVR system 304, or separate computing resources could be provided, including any sort of cloud-based computing resources.

In one specific embodiment, the content analyzer 379 is configured to recognize scene changes in the underlying content. When a different scene is identified in the content analyzer 379 attempts to recognize the scene based upon digital analysis of the audio and/or video. If the scene already exists in the database, then a new occurrence of the recognized scene can be recorded in the database or elsewhere. If the scene is not recognized, then a new entry in the database may be created to identify subsequent occurrences of the same scene. To that end, a digital "signature" or "fingerprint" of the scene is stored for subsequent analysis. Content may be initially recognized based upon information supplied by human data entry (e.g., crowdsourced data, or data entered by a technician), or by data supplied by a content source (e.g., an advertiser, broadcaster, or network), and/or from any other source as desired. Content analyzer 379 is, therefore, able to identify advertisements or other contents of the received television broadcasts and other videos through analysis of the underlying audio or video content.

In many implementations, content identification is performed by the content analyzer 379 in parallel for multiple channels that may be simultaneously received for content aggregation, for collection of advertising data, or any other purpose. A distributor/aggregator, for example, may encode the extracted signals for distribution on a digital network, for aggregation and redistribution of signals over a DBS or cable distribution system, for generating content stored on a RSDVR or VOD service, or for any other purpose. Content identification could be performed while the content is being processed for redistribution. Alternately, content could be stored for subsequent analysis, as desired.

In some embodiments, the content analyzer 379 can perform content analysis in parallel with the encoding provided by the encoder 380. The encoder 380 can encode live broadcast signals and other such video content for adaptive streaming on the network 305 and/or for broadcast via cable, direct broadcast satellite, terrestrial broadcast, and/or the like. Encoder 380, for example, can be used to encode signals into a suitable format for broadcast via cable, DBS, or the like. Such broadcasts may be ultimately received by video player devices 306A-B via the network 305 or the like. In one specific example, the encoder 380 suitably encodes programs contained within signals from the content sources 320 into one or more adaptive streams that each representing a media program in its entirety, but with different bit rates, frame rates, resolution, and/or other levels of quality. Typically, each stream is made up of smaller segments that each represent a small portion of the program content with a single data file. Each stream is typically encoded so that segments of the different streams are interchangeable with each other, often using a common timing index. This allows the video player devices 306A-B to mix and match segments from different streams to create a media stream that effectively adapts as network conditions or other conditions change. Since the segments are typically stored as separate files, segment requests may take the form of conventional hypertext transport protocol (HTTP) constructs (e.g., HTTP "get" instructions) or the like. Such constructs are readily routable on network 305 and can be served by conventional CDN or other web-type servers, thereby providing a convenient mechanism for distributing adaptive media streams to a variety of different client devices on network 305.

Again, other embodiments may use different encoders for the encoder 380. Still, other embodiments may omit the encoding function entirely and perform audio analysis or other content recognition separately from the distribution function. Since many distributors already receive program signals for encoding, there may be an economy of scale in performing the content recognition function at the same time. Other embodiments could nevertheless use different encoding or streaming structures or techniques, as desired, or content could be equivalently aggregated and/or broadcast via satellite, cable, terrestrial broadcast, non-adaptive media stream, and/or the like. As noted above, it is not necessary that the analyzed content be re-broadcast or redistributed by the analyzing party in all embodiments. It may be sufficient for many purposes to simply gather data for recognizing advertisements or other portions of the content, for analyzing or further processing information about the recognized advertisements, and/or for taking other actions as desired without necessarily re-broadcasting or redistributing the content itself.

Content manager 378 is provided to manage and distribute electronic program guide (EPG) data and other information about the programs that are distributed within cloud-based DVR system 304. The content manager 378 may also be implemented to process information relating to advertisements or other portions of the content stream, to associate actions to be performed by the viewer and/or the playback device based upon the content of the stream, and/or for any other purpose.

The data maintained by content manager 378 could include channel information and timing information about each entry so that the particular content can be readily identified. Other embodiments may use different identification data, such as a distributor or network information, or any other information as desired. Some implementations may incorporate conventional EPG data (e.g., data obtained from a vendor or other source), while other implementations may use channel and time so that even portions of a program can be individually identified. Commercials and other advertisements, for example, could be referenced by their channel and broadcast time so that additional actions unique to those advertisements could be enabled. Other embodiments could use different timing references (e.g., references to MPEG presentation time stamps (PTS) in the underlying content, references to event anchors in the content itself, and/or any other timing references) as desired.

In various embodiments, data including information obtained from the content analysis is provided to the video player devices 306A-B. This data could be formatted in any manner. In various embodiments, data could include action data and/or identification data as tags or the like in an XML-type format. Again, many other embodiments could incorporate any number of additional or alternate features to take advantage of the real-time identification feature provided by the broadcaster.

In accordance with the embodiments described herein the video playback recording system, 300 is implemented to perform one or more automated processes during the streaming of recorded playback video content from the cloud-based DVR system 304 to the plurality of video player devices 306A-B. In general, these automated processes provide for the improved delivery of recorded program content in the cloud-based DVR system 304 by providing for the automatic removal, skipping of commercial, or other extraneous content recorded in a recorded video file. Specifically, the cloud-based DVR system 304 provides for the monitoring of a program channel 314 to identify the commercial content in the program channel 314.

The various concepts and examples described herein may be modified in any number of different ways to implement equivalent functions and structures in different settings. The term "exemplary" is used herein to represent one example, instance, or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. On the contrary, various changes may be made in the function and arrangement of the various features described herein without departing from the scope of the claims and their legal equivalents.

What is claimed is:

1. An automated process comprising:
   recording, by a cloud-based digital video recorder (DVR), a video file containing program content, wherein the video file includes extraneous content between a start time of a DVR event file and an actual start time of the program content;
   generating, by the cloud-based DVR, a manifest file containing a program marker identifying the actual start time of the program content;
   deleting, by the cloud-based DVR, a segment of content recorded in the video file before the start time identified by the program marker to generate a modified playback file, wherein the deleted segment of content includes the extraneous content; and
   playing the program content from the modified playback file.

2. The automated process of claim 1, further comprising wherein the actual start time is after the extraneous content at a beginning of the video file.

3. The automated process of claim 1, further comprising generating, by the cloud-based DVR, the manifest file including a first program marker at a start time of the extraneous content and a second program marker at an end time of the extraneous content.

4. The automated process of claim 1, wherein the cloud-based DVR generates the manifest file starting at a beginning of the program marker rather than the beginning of the DVR event file.

5. The automated process of claim 1, wherein deleting the extraneous content reduces a file size of the video file.

6. The automated process of claim 1, further comprising playing the program content without the extraneous content based on the program marker.

7. The automated process of claim 1, further comprising:
   monitoring a channel that transmits the program content to identify additional commercial content; and
   removing the additional commercial content during playback based on a program marker of the additional commercial content.

8. The automated process of claim 7 further comprising continuing to monitor the channel to detect an end of the additional commercial content while recording the program content.

9. The automated process of claim 8 wherein monitoring the channel to identify the additional commercial content includes comparing content on the channel to previously identified commercial content.

10. An automated process comprising:
    recording, by a cloud-based digital video recorder (DVR), a video file containing program content having a start time identified in a DVR event file, wherein the video file includes extraneous content between the start time identified in the DVR event file and an actual start time of the program content;
    generating, by the cloud-based DVR, a manifest file containing a program marker identifying the actual start time of the program content; and
    playing, by the cloud-based DVR, the program content from the video file beginning at the start time identified by the program marker, wherein the played program content omits the extraneous content.

11. The automated process of claim 10, wherein the actual start time is after the extraneous content at a beginning of the video file.

12. The automated process of claim 10, wherein the cloud-based DVR generates the manifest file starting at a beginning of the program marker rather than the beginning of the DVR event file.

13. The automated process of claim 10, wherein the cloud-based DVR generates the manifest file including a first program marker at a start time of the extraneous content and a second program marker at an end time of the extraneous content.

14. The automated process of claim 10, further comprising deleting the extraneous content from the video file in response to the program marker identifying the actual start time of the program content.

15. The automated process of claim 14, wherein deleting the extraneous content reduces a file size of the video file.

16. The automated process of claim 15, further comprising:
    monitoring a channel transmitting the program content to identify additional commercial content; and
    removing the additional commercial content during playback of the program content based on a second program marker.

17. The automated process of claim 16, wherein monitoring the channel to identify additional commercial content comprises comparing the program content from the channel to known commercial content.

18. A cloud-based digital video recorder (DVR) comprising a processor and a memory, wherein the cloud-based DVR performs operations in response to the processor executing instructions stored in the memory, the operations comprising:
    recording, by the cloud-based DVR, a video file containing program content beginning at a start time of a DVR event file, wherein the video file includes extraneous content between the start time of the DVR event file and an actual start time of the program content;
    generating, by the cloud-based DVR, a manifest file containing a program marker identifying the actual start time of the program content; and playing, by the cloud-based DVR, the program content from the video file beginning at the start time identified by the program marker, wherein the played content omits the extraneous content.

19. The cloud-based DVR of claim 18, wherein the cloud-based DVR modifies the video file to generate a modified video file that begins at the program marker.

20. The cloud-based DVR of claim 19, wherein the modified video file has a smaller file size than the video file.

* * * * *